United States Patent [19]

Knipp et al.

[11] 4,315,536
[45] Feb. 16, 1982

[54] PNEUMATIC TIRE

[75] Inventors: Ulrich Knipp, Bergisch-Gladbach; Otto Ganster; Gerd Sahler, both of Leverkusen, all of Fed. Rep. of Germany

[73] Assignee: Bayer Aktiengesellschaft, Leverkusen, Fed. Rep. of Germany

[21] Appl. No.: 913,702

[22] Filed: Jun. 8, 1978

[30] Foreign Application Priority Data

Jun. 28, 1977 [DE] Fed. Rep. of Germany ....... 2729061

[51] Int. Cl.$^3$ ............................................. B60C 19/00
[52] U.S. Cl. .......................... 152/330 R; 152/354 R; 156/123 R
[58] Field of Search ............... 152/330 R, 343, 352 R, 152/354 R, 306, 308, 344; 156/123 R, 125, 126, 127, 129

[56] References Cited

U.S. PATENT DOCUMENTS 4,050,495  9/1977  Olsen ......................... 152/361 R X
4,065,444  12/1977  Delamy ........................ 152/330 R
4,140,165  2/1979  Lapeyre ...................... 156/123 R Primary Examiner—Jeffrey V. Nase
Assistant Examiner—Gene A. Church
Attorney, Agent, or Firm—Gene Harsh; Joseph C. Gil

[57] ABSTRACT

A pneumatic tire comprising an encircling tread and two side members, wherein each side member comprises a side wall having a bead ring and part of the tread backing, characterized in that said tread backing has the following features:

(a) the tread backing is formed as a ring which extends to the center of the tire and is intimately joined to the side wall on the other side;
(b) bands whose length is substantially equal to the width of said ring are fixed on the circumference of said ring in the center of the tread;
(c) the width of said bands is approximately equal to the distance between said bands;
(d) there are recesses in the part of said ring facing the tread, into which said bands of the other side fit during assembly, so that said tread backing has a substantially flush surface after assembly; and
(e) there are beads on the end of said bands for clamping in the tread.

5 Claims, 2 Drawing Figures

PNEUMATIC TIRE

BACKGROUND OF THE INVENTION

The invention relates to a pneumatic tire comprising an encircling tread and two side members, wherein each side comprises a side wall having a bead ring and part of the tread backing.

The assembly of pneumatic tires composed of a plurality of separately produced components is known. This type of construction can lead to lower production costs and it is possible to use different materials for different tire components. The joints are weak points in such tires. Additional reinforcements in the axial direction are needed in the tread if the tire is made of two half-tires since the tread alone cannot absorb axial forces sufficiently. These extra strengthenings increase the production costs.

DESCRIPTION OF THE INVENTION

Figure 1:
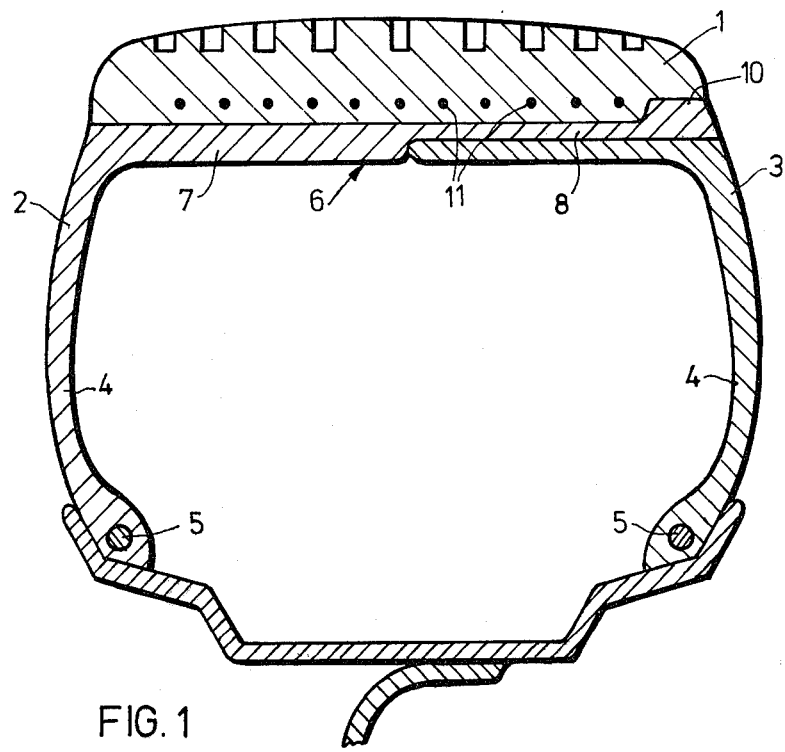
FIG. 1 shows a cross-section through a tire.
Figure 2:
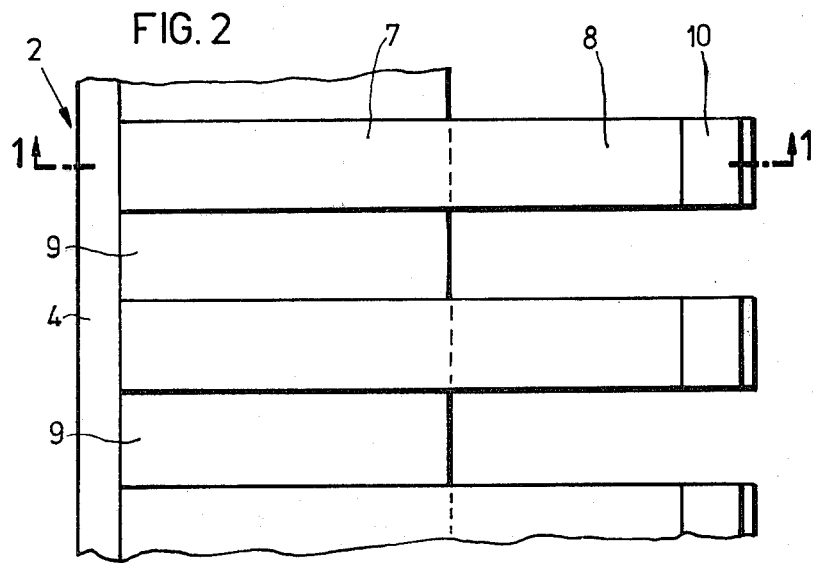
FIG. 2 shows a plan of the tread backing of a side member.

The object of the invention is to provide a multicomponent tire with good use properties which can be produced economically. The object is achieved with a pneumatic tire whose tread backing has the following features:

(a) The tread backing is formed as a ring which extends to the center of the tire and is intimately joined to the side wall on the other side;

(b) Bands whose length is equal to the width of the ring are fixed around the circumference of the ring in the center of the tread;

(c) The width of the bands is approximately equal to the distance between the bands;

(d) There are recesses in the part of the ring facing the tread into which the bands of the second side fit during assembly, so that the tread backing has a substantially flush surface after assembly;

(e) There is a bead at each end of the bands for clamping in the tread.

The tire has the particular advantage of high quality, and tires which are highly stressed can thus be constructed in this way. The tread is held and clamped in by the beads at the end of the bands. Additional axial reinforcements are not required. The clamping effect is further increased under load and when the internal pressure of the tire is increased.

The beads at the end of the bands ensure that the tire is held together. Nevertheless, the sides and the tread are stuck together using conventional adhesives. Most suitable are PUR-adhesives. For instance ®Desmocoll 176, ®Desmocoll 400 or ®Desmocoll 500 may be used, in combination with ®Desmodur R as curing agent. It is known from the state of the art to insert circumferential reinforcements, and this is also possible with the instant tire. Suitable tire materials preferably include elastomers based on polyurethane, rubber, polyolefins, polyamide or ethylene-propylene-diene mixed polymerizate. They may contain reinforcing inserts in the form of short fibers, non-woven fabrics, wires or cloths. It is even possible to use inserts which are produced separately. Relatively flexible material may be used for the tread and relatively rigid material for the side walls.

The simple production of the tire components is advantageous, and the tools do not require undercuts. It is simple to apply ribbing to the sides thus allowing the emergency running properties to be improved.

The tires are manufactured by injection molding or by the rim-process or by press molding. Metal tools are required. The tools are simple and they need no undercuts, because they can be made of only two parts, a male and female mold part.

The tire is illustrated by way of example in the drawings and is described in more detail below.

The tire comprises substantially three parts; a tread 1 and two side members 2 and 3. The side member consists of the side wall 4 with a bead ring 5, and a tread backing 6. Side members can be produced by fiber filled thermoplastic polyurethans or by fiber filled thermoplastic rubbers by injection molding. The tread is produced by casting, injection molding or mold pressing and can be made of the different reinforced elastomers PUR and the different rubbers.

The tread backing is in the form of a ring 7 which is joined to the side wall 4 during production. The ring extends into the center of the tread. Mesh-like bands 8 extend from the ring 7. The thickness of the bands 8 is half that of the ring 7. The bands 8 are flush with the ring 7 on the side of the ring attached to the tread. There are recesses 9 in the ring between the bands 8 on the side of the ring facing the tread 1. When assembling the two side members 2 and 3, the bands 8 of the other side member come to rest in respective recesses 9 and the tread backing 6 is thus almost flush.

There are beads 10 on the outer end of the tread side 1 each of mesh-like band 8. They are adapted to corresponding recesses in the tread 1. The drawings also show reinforcing inserts 11 which extend circumferentially in the tread 1. Axial reinforcements in the tread are not needed in this tire. The side members 2 and 3 can be produced in one operation with the side wall 4 and the bands 8 provided with beads 10. The sides 2 and 3 and the tread 1 are stuck together using a suitable adhesive. A very stable cohesion of the tire is obtained in a simple manner by the additional clamping of the treads 1 which is provided by the beads 10 at the end of the straps 8.

What is claimed is:

1. A pneumatic tire comprising an encircling tread and two side members, wherein each side member comprises a side wall having a bead ring and part of the tread backing, characterized in that said tread backing has the following features:

(a) the tread backing is formed as a ring which extends to the center of the tire and is intimately joined to the side wall on the other side;

(b) bands whose length is substantially equal to the width of said ring are fixed on the circumference of said ring in the center of the tread;

(c) the width of said bands is approximately equal to the distance between said bands;

(d) there are recesses in the part of said ring facing the tread, into which said bands of the other side fit during assembly, so that said tread backing has a substantially flush surface after assembly and so that each band will be in direct contact with the tread; and (e) there are beads on the end of said bands for clamping in the tread.

2. A pneumatic tire according to claim 1, characterized in that elastic materials based on polyurethane, rubber, polyolefin, polyamide or ethylene-propylene-diene-mixed polymerizates are used.

3. A pneumatic tire according to claim 1, characterized in that said side members and said tread are produced from different elastic materials.

4. A pneumatic tire according to claim 1, characterized in that there are reinforcing inserts.

5. A pneumatic tire according to claim 1, characterized in that there are ribs in said side members.

* * * * *